United States Patent [19]

Himelstein et al.

[11] Patent Number: 4,683,468
[45] Date of Patent: Jul. 28, 1987

[54] METHOD FOR MANIPULATION OF GRAPHIC SUB-OBJECTS IN AN INTERACTIVE DRAW GRAPHIC SYSTEM

[75] Inventors: Carol S. Himelstein; John S. Wang, both of Austin, Tex.

[73] Assignee: International Business Machines Corp., Armonk, N.Y.

[21] Appl. No.: 710,762

[22] Filed: Mar. 11, 1985

[51] Int. Cl.$^4$ ............................................. G09G 1/16
[52] U.S. Cl. ................................... 340/709; 340/710; 340/747; 340/707
[58] Field of Search ............... 340/707, 709, 710, 723, 340/724, 727, 751, 747; 364/512, 521

[56] References Cited

U.S. PATENT DOCUMENTS

| Re. 31,200 | 4/1983 | Sukonick et al. | 340/709 X |
| 3,509,350 | 4/1970 | Gundrum | 340/707 X |
| 3,846,826 | 11/1974 | Mueher | 340/710 X |
| 3,882,446 | 5/1975 | Brittion et al. | 340/723 X |
| 4,392,130 | 7/1983 | Lundström et al. | 340/709 X |
| 4,451,895 | 5/1984 | Sliwkowski | 340/707 X |
| 4,543,571 | 9/1985 | Bilbrey et al. | 340/709 X |

OTHER PUBLICATIONS

"The Lisa Computer System", Gregg Williams, Byte Pub. Inc., Feb. 1983, pp. 33-50.
Macintosh, MacPaint Instruction Manual., Apple Computer, Inc.

Primary Examiner—Gerald L. Brigance
Attorney, Agent, or Firm—Richard E. Cummins; James H. Barksdale

[57] ABSTRACT

A method for editing sub-objects in an interactive draw graphic application which allows the operator to apply the edit action to the sub-object without affecting the rest of the object. Vertices of the object that are defined by the adjacent common end points of the sub-object are assigned attributes that either permit or prevent the end points from being separated during the sub-object editing process. If the end points are permitted to separate, actual separation is determined by the operator during the sub-object selection action and is based upon whether the point of selection is in the center third of the sub-object or the end third of the sub-object adjacent the vertex to be separated.

11 Claims, 7 Drawing Figures

METHOD FOR MANIPULATION OF GRAPHIC SUB-OBJECTS IN AN INTERACTIVE DRAW GRAPHIC SYSTEM

TECHNICAL FIELD

This invention relates in general to interactive draw graphic systems, and in particular, to an improved method for manipulating a segment (sub-object) of the graphic object.

BACKGROUND ART

The prior art has disclosed the various interactive draw graphic arrangements in which a graphic object may be created and edited, e.g., modified by an operator following a sequence of interactions with the systems. These systems generally include an all-points addressable display device which functions to display on its screen, graphic object creating actions or editing actions that the operator has selected and entered into the system by means of a keyboard or a mouse.

Interactive draw graphic systems may be physically packaged as a dedicated type stand-alone work station or be merely a group of separate, cable-connected personal computer system components that is executing a draw graphic program.

Most all prior art interactive draw graphic systems provide the operator with the ability to edit a graphic object once it has been created. The typical editing action provided by prior art systems include move, copy, rotate, stretch, shrink, scale up or down, and delete or erase. In the process of editing an object, the operator must select the particular edit action and for editing actions such as move, rotate, and scale, the operator must also provide a distance value to the system. In addition, in some more sophisticated draw graphic arrangements, the operator is provided with the ability to select a particular object from a group of individual objects that are displayed in an overlaid fashion on the screen.

The manner in which these interactive steps are implemented in the system is sometimes referred to as the operator interface and it is this interface that determines if the particular graphic application is "user friendly" which is of paramount importance in the personal computer market.

Some prior art systems permit the graphic editing actions that are available for editing complete graphic objects to also be used to edit a sub-object. The term sub-object refers to a line segment that exists between two defined points which are included in the definition of the main object. The end points of the subject object may or may not be connected to another line segment. If the object is a closed object, the the end points of each sub-object are connected. If, on the other hand, the object is open, then at least one of the end points is not connected.

A "joint" or a vertex is formed when two end points of different sub-objects are interconnected.

The ability of the system to edit sub-objects is important to the operator's efficiency, since it means that the object does not have to be re-drawn. Prior art sub-object graphic editing systems are somewhat limited in the kind of editing actions that are permitted once the sub-object has been selected. In these systems, movement of the sub-object, for example, causes the line segments that are attached to the end points of the moving sub-objects to "rubber band." For example, if the subject object is the right side of a square and the movement of the sub-object is to the right in a generally horizontal direction, the square is changed to a rectangle. If, on the other hand, the sub-object is moved vertically, the square is changed to a parallelogram. Similar type "rubber banding" actions occur with other editing actions in other type objects.

The rubber banding action occurs because the system has defined all of the sub-objects that define the main object as line segments between two points, each of which is represented by an x, y coordinate. If the point is moved by the editing action on a sub-object, the system redefines the end points for the sub-object and also for the attached line segments. If the operator merely wants to modify the appearance of the sub-object and not the total object, he must erase the sub-object and re-draw it. This is not very efficient from the operator standpoint and could be very frustrating if the sub-object is overlaid with a number of other graphic objects since it is quite easy to erase the wrong lines in the erasing process.

The present invention avoids the above problems of prior art draw graphic systems by providing the operator with the choice of whether or not to modify the rest of the object when the sub-object is being modified.

SUMMARY OF THE INVENTION

In accordance with the method of the present invention, the operator is provided with the ability to modify a sub-object of a selected graphic object without modifying the other portions of the selected graphic object. For example, if the operator selects a square graphic object in one side as the sub-object, the selected side can be moved completely away, i.e., detached from the corners without affecting the other three sides of the square. Alternately, the selected side can be detached at either end point and, in effect, pivoted about the other end point which acts as a hinge. The method involves the step of assigning a binary attribute to the end points of the sub-object that determine if the vertex defined by the sub-objects can be broken. In one implementation, the assignment is made for the entire object, preferably, but not necessarily at the time the object is created. If the assignment is made by the operator to have the vertex break, the operator controls which one or both vertexes break by where, along the length of the sub-object, it is selected.

It is therefore an object of the present invention to provide an improved method for editing sub-objects in an interactive draw graphic system.

Another object of the present invention is to provide the operator of an interactive draw graphic system the ability to manipulate sub-objects of the selected object without modifying the remaining portion of the selected object.

A still further object of the present invention is to provide a method for manipulating sub-objects of selected graphic object in an interactive draw graphic system in which the operator determines during the sub-objective identification process whether one or both end points of the sub-object will be detached from the object during the editing process.

Objects and advantages other than those mentioned above will become more apparent to those persons skilled in the art from the following description when read in connection with the drawing.

DESCRIPTION OF THE PREFERRED EMBODIMENT

Figure 1:
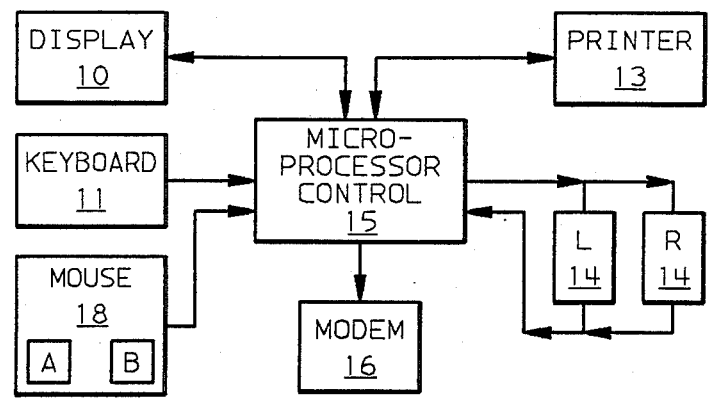
FIG. 1 illustrates in block diagram form, a typical interactive draw graphic system.

FIG. 1 illustrates the general arrangement of a typical interactive draw graphic system. The system shown comprises a display device 10 for displaying information to the operator, a keyboard 11 which the operator uses to enter information including commands and data into the system, a printer 13 which functions to provide hard copy output of information generated by the system and selected by the operator, a pair of diskette drives, 14L and 14R which function to transfer information between the system and the magnetic storage diskettes that are removably associated with the diskette drives and which store both program information, text information, and graphic information. System components 10, 11, 13 14L, and 14R are connected, as shown in FIG. 1, to the microprocessor Block 15 which functions as the overall control for the system and interconnects the various system components to perform their specific function at the appropriate time. The system of FIG. 1 also includes a modem 16 which functions to interconnect that system to other systems through various communication links.

Since the system of FIG. 1 is adapted to process graphic applications such as interactive draw type application programs, it should be assumed that the display device 10 is an all-points addressable type graphic display device in which each individual picture element (PEL) may be addressed, in contrast to a text-type display where only a character box is addressable. Since interactive draw graphic applications are to be run by the system, an auxiliary input device 18 is also provided for permitting more rapid positioning of the cursor on the screen than might be obtainable by the cursor positioning keys on the keyboard 11. Such devices are well known in the art, and for purposes of this description, it will be assumed that device 18 is a conventional "mouse" equipped with two buttons or keys, 18A and 18B. Devices such as a data tablet, having similar functions to the mouse, could also be employed for input device 18.

Figure 2:
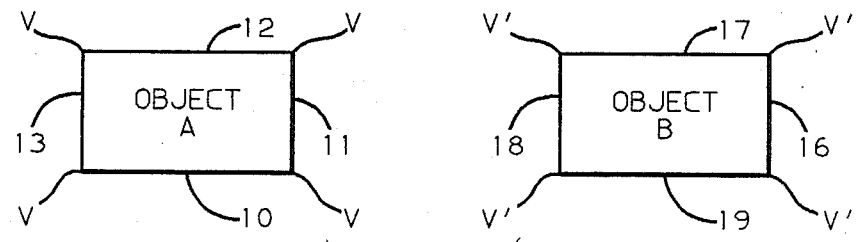
FIG. 2 illustrates a pair of identical rectangular graphic objects having different break attributes assigned to their respective vertices.

It should be assumed that the system of FIG. 1 is provided with a suitable interactive draw graphic type program which permits the operator to draw graphic objects on the screen of device 10, similar to the objects shown in FIG. 2 which illustrates a display screen having two rectangularly shaped objects, A and B.

It should be further assumed that object A, as created, was assigned a "stay attached vertex attribute," while object B was assigned a "break vertex attribute." The manner in which attributes may be assigned to sub-objects in this system are well known to those persons skilled in the interactive information system art since such factors as color, highlighting, etc. are well known attributes of displayed information in such system. In the preferred embodiment the attribute is preferably established as one of the system defaults at the time the draw graphic program is initially installed on the system of FIG. 1 and a provision is included in the program to enable that default to be changed at some subsequnt time if the operator so desires.

It should also be understood, that in the following description the function of selecting the graphic object to be edited is not described, but that editing the sub-object is, by definition, a sub-set function of the main object editing function. The following description describes, in connection with FIGS. 3, 4, and 5, the different results that occur for objects A and B of FIG. 2, depending on where the sub-object point of selection occurred. In this regard, the selection of the sub-object is in accordance with the well known approach of positioning a pointing cursor adjacent the sub-object and operating either a mouse key or keyboard key, having the function of advising the system that the closest object is the one that is selected.

The two objects, A and B, in FIG. 2 represent rectangles previously created by the operator using a cursor locating device. As mentioned previously, the locating device can be a mouse, keyboard choice, etc. Objects A and B differ only in the attributes of their respective vertices. Object A's vertices V are defined to 'remain attached', no matter how the operator manipulates any of the sub-objects 10, 11, 12, or 13. Object B's vertices V' are designed to 'break' whenever the operator manipulates any of its sub-objects, 16, 17, 18, or 19.

Figure 3:
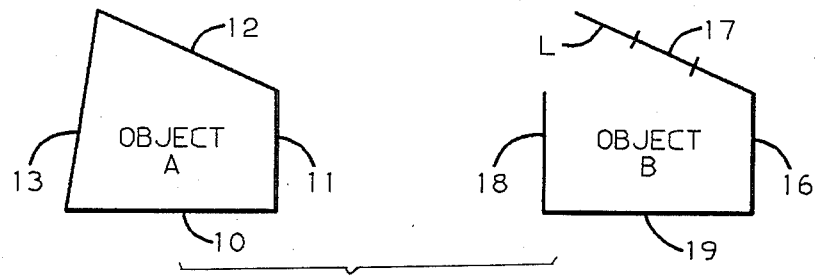
FIG. 3 illustrates the modifications to the graphic objects shown in FIG. 2 which result from the sub-object selecting point, being in the left third of the sub-object.

FIG. 3 illustrates what happens when the operator selects the line segments 12 and 17 on objects A and B on the left third L of the line. In object A, since the vertices have been defined to stay attached, the entire object changes shape to keep up with the movement of the line segment 12 which results from the operator moving the mouse. However, object B simply breaks the end point on the left side L of the line 17, saving the object from having to "rubber band" to keep up with movement of the sub-object.

Figure 4:
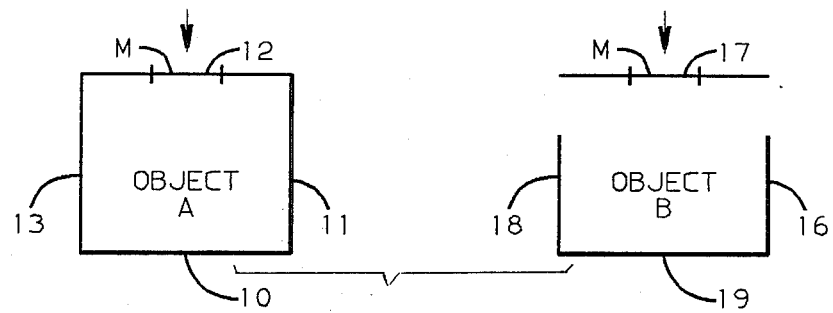
FIG. 4 illustrates the modification to the objects shown in FIG. 2 which result from the sub-object selection point being in the middle of the sub-object.
Figure 5:
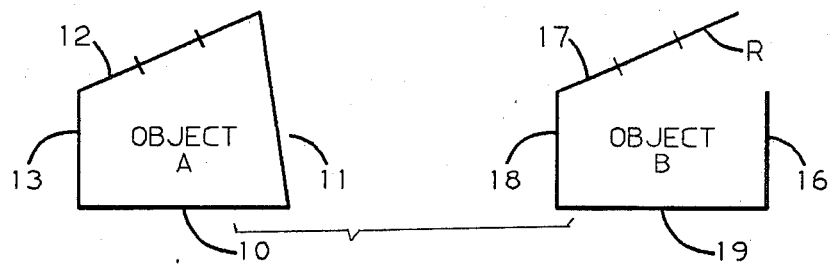
FIG. 5 illustrates the modifications to the objects shown in FIG. 2 which result from the sub-object selection point being in the right third of the sub-object.

FIGS. 4 and 5 illustrate the results of other manipulations of the sub-objects 12 and 17 with different sub-object selecting points. In FIG. 4, the operator is manipulating the line segments 12 and 17 from the middle third M of the line, which affects both end points. In FIG. 5, the operator is manipulating the line segments 12 and 17 from the right third R of the line, which affects only the end point to the right of the line segment.

It should be noted that the operator can apply most actions on the sub-objects 12 and 17 that can be applied to objects as a whole. In other words, the operator can move, rotate, scale up, scale down, stretch, and shrink a sub-object. The end result is dependent upon how the vertices of that object were originally defined and on which third of the line segment representing the sub-object, the operator made his selection.

Figure 6A:
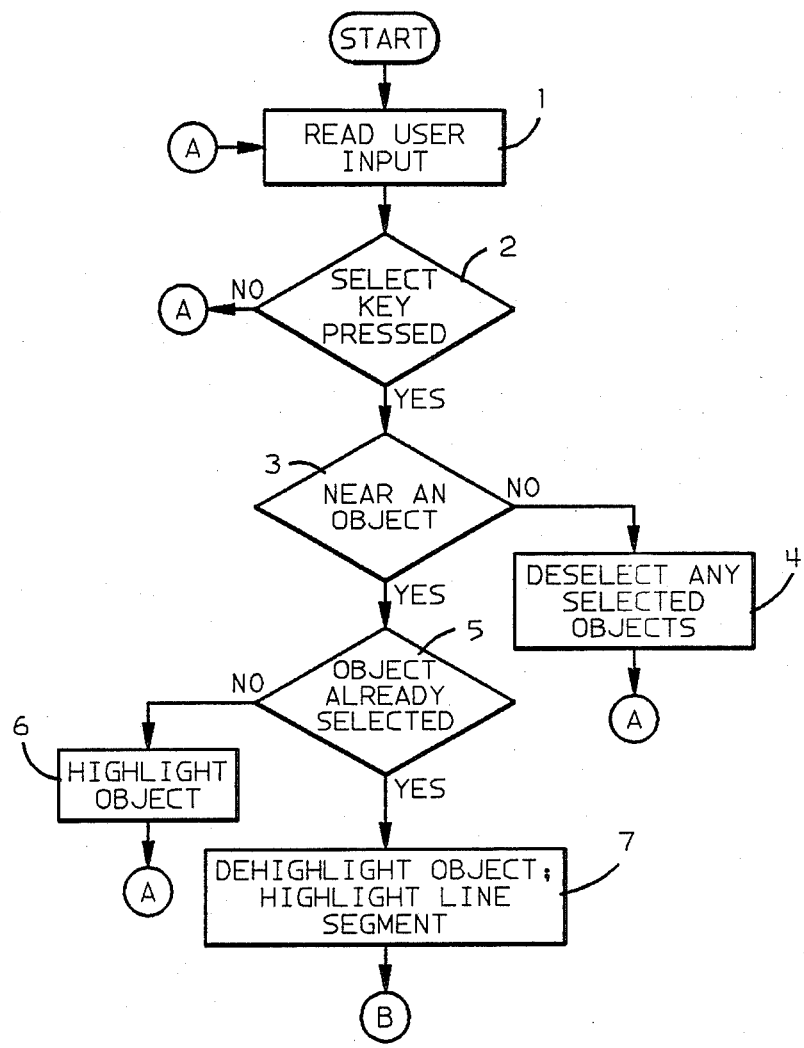
FIGS. 6A and 6B are a flowchart setting forth the steps involved in the improved method of editing graphic objects in an interactive draw graphic system.
Figure 6B:
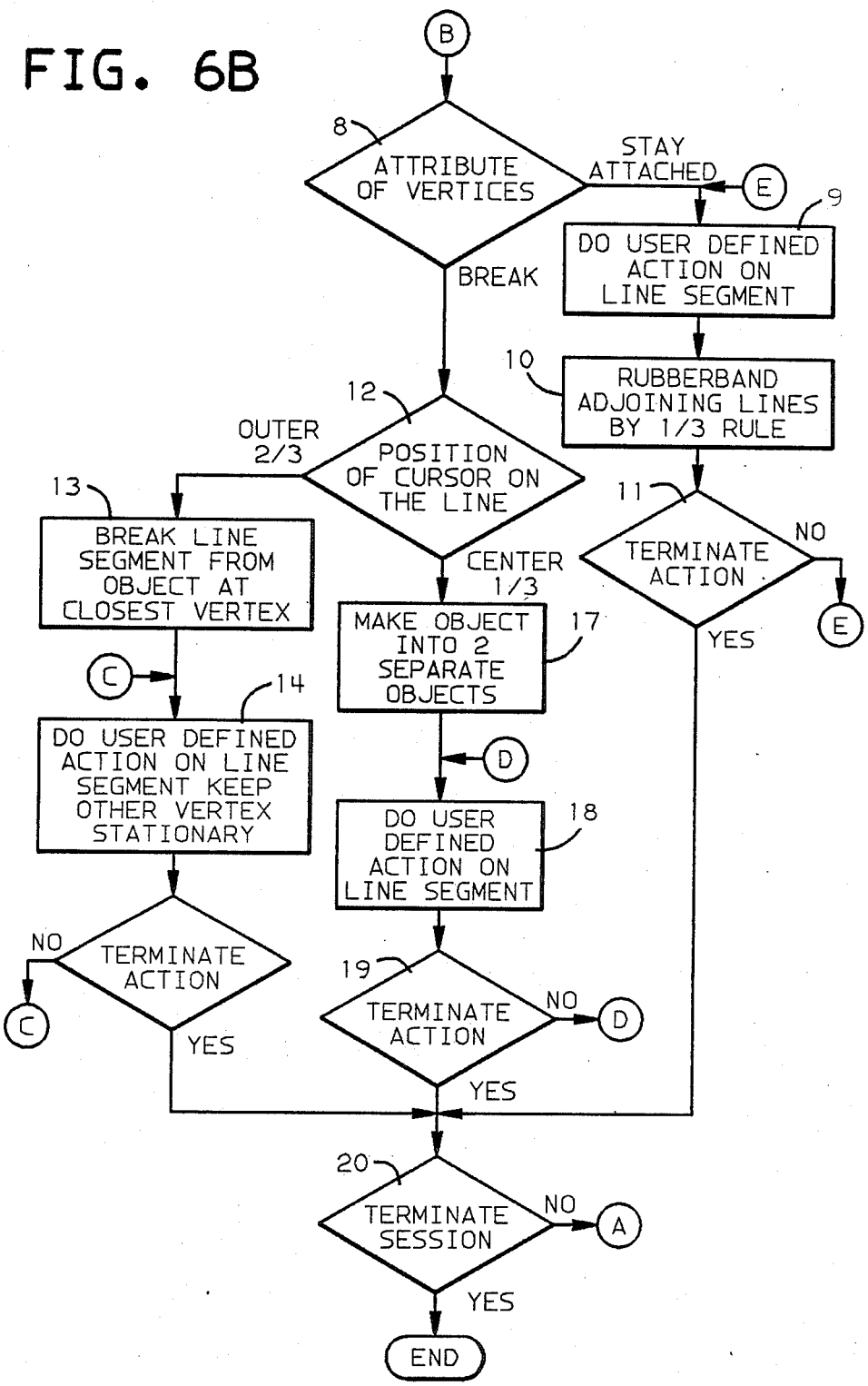

The various steps involved in the method of editing the sub-objects described in connection with FIGS. 1–5 will now be described in connection with the flowchart of FIG. 6.

First: assume the operator has obtained a pointer or cursor. The operator then moves the pointer on the display screen by means of a locator device, such as a mouse. During the movement of the mouse, the application is reading the locator device for movement of the pointer or pressing of the mouse keys (buttons). The reading of the location device is depicted in Block 1.

When the application detects that a mouse key has been pressed, it checks to see if the key is the Object Select Key as shown in Block 2. If the Select Object Key has been pressed, then the application checks to see if the pointer is within selecting range of any graphic objects. This is shown in Block 3. If the application determines that the pointer is not close enough to any objects to select, then it insures that all graphic objects are dehighlighted, as shown in Block 4, and returns via Terminal A to reading input in Block 1.

If the pointer is close enough to an object to select it, then the application has to determine if that object has already been selected, as shown in Block 5. If the object has not been selected, then the application highlights the object, as shown in Block 6, and waits for further operator input. The operator, at this point, can do a range of actions on the object, but these are not the subject of this invention. If the selected object is already selected, then the operator is trying to select a portion of the object. Therefore, the line segment he is pointing to is highlighted and the rest of the object dehighlighted a shown in Block 7.

Now that the line segment has been selected, the application must determine how the rest of the object will be affected by manipulation done on the sub-object. This decision is done in Block 8. If the vertices of the object have the attribute of "stay attached", then the application immediately begins doing the action specified by the operator, either through implicit actions or through pop-down menus, as shown in Block 9. Since the vertices must stay attached to the rest of the object, the adjoining lines must rubber band in accordance with the one-third rule to follow the line segment as it is manipulated, as shown in Block 10. At this point, the application checks to see if the operator has indicated that the action terminate, as shown in Block 11. If not, then control passes back to Block 9 until such time as the operator indicates that it is time to stop.

If the vertices of the object have the attribute of "Break," then the application has to determine which vertices and how many to break. This is done by figuring out the position of the pointer on the line, a shown in Block 12. If the pointer is on either of the outer thirds L or R of the line, then the application must break the vertex closest to the pointer, as shown in Block 13. This is so that when the operator starts to manipulate the line segment, the end of the line closest to the pointer will be free from the rest of the object. The other vertex, if there is one, will remain attached to the line segment and will remain stationary no matter what manipulations the operator does with the line segment. In Block 14, the application carries out whatever action the operator specified, either through implicit actions or through pop-down menus. At this point, the application checks to see if the operator has indicated that the action terminate, as shown in Block 16. If not, then control passes back to Block 14 until such time as the operator indicates that it is time to stop.

If the pointer was in the middle third M of the line segment, then the application must break the line segment away from the object completely, as shown in Block 17. The operator can now do any action on the line segment without any affect on the rest of the original object. This is shown in Block 18. At this point, the application checks to see if the operator has indicated that the action terminate, as shown in Block 19. If not, then control passes back to block 18 until such time as the operator indicates that it is time to stop.

Once the action has been terminated, the applciation checks to see if the operator wishes to terminate the graphics session. If not, then control returns to the top of the diagram, Block 1. The application will continue until the operator indicates that the session is to terminate at Block 20.

An illustration of an application program useable by the processor ofFIG. 1 for causing sub-object manipulation of graphic objects to occur during interactive graphics follows. This program is in program design language from which source and machine code are derivable. It is to be assumed that the system is under mouse and keyboard control. The mouse controls the movement of a visible pointing cursor which allows the operator to determine the current cursor position on the screen.

The following is an explanation of the program. The application calls a routine to query the mouse input device to determine if a mouse key has been pressed (CALL READ_INPUT DEVICE). READ_INPUT_DEVICE will return the selected key and the current x, y location of the pointing cursor.

If the OBJECT_SELECT_KEY is pressed, a routine is called to determine if the x and y location returned from READ_INPUT_DEVICE is currently pointing to a graphic object (e.g., rectangle). If the operator was not pointing at any object, then the application insures that no objects are currently selected by calling DESELECT_OBJECTS. If the operator pointed to a graphic object, then the application must determine if the object is already selected by calling the function OBJECT_SELECTED. If the object is not already selected, then the object is highlighted by a routine (CALL HIGHLIGHT_OBJECT). If the object is already selected, then the operator is trying to select part of the object, namely a line segment. Therefore, the object must be dehighlighted (DEHIGHLIGHT_OBJECT). FIND_LINE_SEGMENT will return a handle to the line segment that the operator is pointing at. The application then highlights the line segment (HIGHLIGHT_OBJECT).

Next, the application must determine the attributes of the vertices of the object. The attributes will determine how the rest of the object responds to changes on the line segment. The vertex attributes are determined by a routine (GET_VERTEX_ATTR). If the attribute is "Stay Attached" then the line segment will stay attached to the object and the adjoining line segments will rubber band to follow the movement of the line segment. The line segment and adjoining lines are modified within a REPEAT loop. The first step in the loop is to read the input device (READ_INPUT_DEVICE). With the output from the read input device routine a routine is called to manipulate the sub-object (GRAPHIC_SUBOBJECT_ACTION). This routine determines which action the operator wants and modifies the object on the screen to conform to the requirements of the action. Upon return from this routine, the application has to rubber band any adjoining lines to meet the new end points of the line segment (RUBBERBAND). This loop continues until the SELECT_KEY_TYPE is equal to ACTION_COMPLETE.

If the VERTEX_ATTRIBUTE was equal to "Break" then one or both of the end points of the line can be broken away from the object. The application determines which end points and how many to break away by looking at the position of the pointer on the lines segment. CLOSEST_VERTEX returns the vertex which was closest to the pointer if the pointer was on an outer third of the line segment. If the pointer was on the inner third of the line, the CLOSEST_VERTEX returns a nil pointer. When the pointer is on the inner third of the line segment, then both end points are be broken away from the original object, thus creating an entirely new object and modifying the original (BREAK_OBJECT). At this point, the application is ready to let the operator start modifying the line and enters a REPEAT loop that read input from the operator (READ_INPUT_DEVICE), and then calls a routine to manipulate the line object (GRAPHIC_ACTION). This loop continues until the SELECT_KEY type is equal to ACTION_COMPLETE.

If the pointer was on one of the outer thirds of the line at the time of selection, then only one end point will be broken away from the original object (BREAK_VERTEX). The other end point, if there is one, will remain attached and stationary, no matter how the operator manipulates the line segment. The application then enters a READ loop for the manipulation of the line segment. The first step of the loop is to read operator input (READ_INPUT_DEVICE), and (GRAPHIC_SUBOBJECT_ACTION). This loop continues until the SELECT_KEY_TYPE is equal to ACTION_COMPLETE.

When the operator has completed the action on the object, (i.e., SELECT_KEY_TYPE is equal to ACTION_COMPLETE), then the application checks to see if the operator would like to terminate the graphics session. If not, then the process starts all over again. Otherwise, the application terminates.

```
PSEUDO CODE FOR SUBOBJECT MANIPULATION
Repeat
  Call read_input_device (select_key_type , x, y)
  If select_key_type = object_select_key then
    Call find_object (x, y, object_ptr)
    If object_ptr = nil then
    (* no object was close enough to be selected *)
      Call deselect_objects (* deselect any objects
      that may already be selected *)
    Else
      If not object_selected (object_ptr) then
      (* if object not already selected *)
        Call highlight_object (object_ptr)
      Else
        Call dehighlight_object (object_ptr)
        Call find_line_segment
        (object _ptr, x, y, line_segment)
        Call highlight_object (line _segment)
        Call get_vertex_attr
        (object_ptr, vertex_attribute)
        If vertex_attribute = "Stay Attached" then
        Repeat
          Call read_input_device
          (Select _key _type, x, y)
          Call graphic_subobject_action
          (line_segment, x, y)
          Call rubberband (line_segment, object_ptr)
        Until select_key_type = action_complete
        Else (* vertex_attribute = "break" *)
```

```
-continued
PSEUDO CODE FOR SUBOBJECT MANIPULATION
          vertex = closest_vertex (x, y, line_segment)
          If vertex = nil then
          (* we are at the center of the line *)
            Call break_object
            (line_segment, object_ptr)
            Repeat
              Call read_input_device
              (select_key_type, x, y)
              Call graphic_action (line_segment, x, y)
            Until select_key_type = action_complete
          Else (* the pointer is on an
          outer 3rd of the line *)
            Call break_vertex (object_ptr, vertex)
            Repeat
              Call read_input_device
              (select_key_type, x, y)
              Call graphic_subobject_action
              (line_segment, x, y)
            Until select_key_type = action_complete
          Endif
        Endif
      Endif
    Endif Until select_key_type = session_complete
```

While the invention has been particularly shown and described with reference to a preferred embodiment thereof, it will be understood by those skilled in the art that various changes in the form and detail may be made without departing from the scope and spirit of the invention.

I claim:

1. A method for editing a sub-object of a graphic object displayed in an interactive draw graphic system in which said object has at least one vertex and a pair of selectable line segment sub-objects which define said vertex, said method including the steps of;
   (a) assigning to said vertex an attribute which permits said vertex to 'break' during a sub-object editing action,
   (b) selecting said line segment sub-object at a different point along the length of said line segment depending upon the modification desired on said sub-object, and
   (c) moving said sub-object selected in step b) to obtain said desired modification.

2. The method recited in claim 1 in which said graphic object comprises a plurality of line segment sub-objects and a corresponding plurality of vertices, and said step of assigning an attribute to said vertex further includes the step of assigning the same attribute to all said vertices.

3. The method recited in claim 2 in which said step of selecting a line segment sub-object includes the step of positioning a cursor adjacent to said sub-object to be selected and signaling said system to select said sub-object.

4. The method recited in claim 3 in which said cursor is a pointing cursor, said step of positioning includes the step of activating a cursor control mouse'device attached to said system, and said step of signaling involves actuating a button on said mouse' device.

5. The method recited in claim 4 in which said selecting step selects said line segment at a point in the middle third portion of said line segment when the modification desired involves separating said subobject from the rest of said object.

6. The method recited in claim 5 in which vertices associated with the selected sub-object break during the editing action on said sub-object.

7. The method recited in claim 4 in which said selecting step selects said line segment at an end third portion when the modification desired is to break only the one vertex associated with said end third portion.

8. The method recited in claim 7 which said modification involves movement of said selected sub-object without moving any of the non-selected sub-objects.

9. The method recited in claim 8 in which said movement of said selected sub-object involves a pivoting motion of said sub-object about said end point of said selected sub-object not associated with the said selected end third portion.

10. The method recited in claim 9 in which said step of assigning said attribute also includes the step of selectively assigning a 'stay attached' attribute to each vertex so that said editing action on said selected sub-object modifies the other sub-objects which have end points attached to the selected sub-object.

11. The method recited in claim 10 in which said step of editing said selected sub-object causes said attached non-selected sub-objects to move, stretch, and shrink in order to conform to the movement of said selected sub-object.

* * * * *